US009881619B2

(12) United States Patent
Visser et al.

(10) Patent No.: US 9,881,619 B2
(45) Date of Patent: Jan. 30, 2018

(54) AUDIO PROCESSING FOR AN ACOUSTICAL ENVIRONMENT

(71) Applicant: QUALCOMM Incorporated, San Diego, CA (US)

(72) Inventors: Erik Visser, San Diego, CA (US); Wenliang Lu, San Diego, CA (US); Lae-Hoon Kim, San Diego, CA (US); Yinyi Guo, San Diego, CA (US); Shuhua Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/081,664

(22) Filed: Mar. 25, 2016

(65) Prior Publication Data

US 2017/0278519 A1    Sep. 28, 2017

(51) Int. Cl.
| | |
|---|---|
| *G10L 19/02* | (2013.01) |
| *G10L 19/002* | (2013.01) |
| *G10L 25/30* | (2013.01) |
| *G10L 25/48* | (2013.01) |
| *G10L 21/00* | (2013.01) |

(52) U.S. Cl.
CPC ............ *G10L 19/002* (2013.01); *G10L 25/30* (2013.01); *G10L 25/48* (2013.01)

(58) Field of Classification Search
CPC ........ G10L 19/002; G10L 25/48; G10L 25/30
USPC ......................................... 704/229, 226, 230
See application file for complete search history.

(56) References Cited

U.S. PATENT DOCUMENTS

| | | | |
|---|---|---|---|
| 8,831,255 | B2 | 9/2014 | Crawford et al. |
| 8,831,937 | B2 | 9/2014 | Murgia et al. |
| 8,947,347 | B2 | 2/2015 | Mao et al. |
| 9,099,096 | B2 | 8/2015 | Yoo et al. |
| 2004/0213415 | A1 | 10/2004 | Rama et al. |
| 2010/0290632 | A1 | 11/2010 | Lin |
| 2012/0014525 | A1 | 1/2012 | Ko et al. |
| 2012/0095817 | A1* | 4/2012 | Kamil ................ G06Q 30/0241 705/14.4 |

(Continued)

FOREIGN PATENT DOCUMENTS

| | | |
|---|---|---|
| EP | 1983799 A1 | 10/2008 |
| EP | 2063419 A1 | 5/2009 |

(Continued)

OTHER PUBLICATIONS

Partial International Search Report—PCT/US2017/016376—ISA/EPO—dated May 8, 2017.

(Continued)

*Primary Examiner* — Thierry L Pham
(74) *Attorney, Agent, or Firm* — Toler Law Group, PC

(57) ABSTRACT

An apparatus for detecting a sound in an acoustical environment includes a microphone array configured to detect an audio signal in the acoustical environment. The apparatus also includes a processor configured to determine an angular location of a sound source of the audio signal. The angular location is relative to the microphone array. The processor is also configured to determine at least one reverberation characteristic of the audio signal. The processor is further configured to determine a distance, relative to the microphone array, of the sound source along an axis associated with the angular location based on the at least one reverberation characteristic.

17 Claims, 10 Drawing Sheets

(56) References Cited

U.S. PATENT DOCUMENTS

| | | |
|---|---|---|
| 2013/0272527 A1 | 10/2013 | Oomen et al. |
| 2014/0321653 A1 | 10/2014 | Mitsufuji |
| 2014/0355795 A1 | 12/2014 | Xiang et al. |
| 2015/0256956 A1 | 9/2015 | Jensen et al. |
| 2015/0264505 A1 | 9/2015 | Tsilfidis et al. |
| 2016/0057522 A1* | 2/2016 | Choisel .................... H04R 1/08 381/92 |

FOREIGN PATENT DOCUMENTS

| | | |
|---|---|---|
| EP | 2642768 A1 | 9/2013 |
| EP | 2916321 A1 | 9/2015 |
| JP | 2005203981 A | 7/2005 |
| JP | 2017107141 A | 6/2017 |
| WO | 2017064367 A1 | 4/2017 |

OTHER PUBLICATIONS

Falk, T.H., et al., "Temporal Dynamics for Blind Measurement of Room Acoustical Parameters", IEEE Transactions on Instrumentation and Measurement, Mar. 1, 2010, vol. 59, Issue 4, IEEE, Piscataway, NJ, pp. 978-989.

Czyzewski A., "Automatic Identification of Sound Source Position Employing Neural Networks and Rough Sets", Pattern Recognition Letters, Elsevier, Amsterdam, NL, Mar. 1, 2003, vol. 24, No. 6, pp. 921-933, XP004396087, ISSN: 0167-8655, DOI: 10.1016/S0167-8655(02)00204.

International Search Report and Written Opinion—PCT/US2017/016376—ISA/EPO—dated Aug. 25, 2017.

* cited by examiner

AUDIO PROCESSING FOR AN ACOUSTICAL ENVIRONMENT

I. FIELD

The present disclosure is generally related to audio processing.

II. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

A wireless telephone may capture audio signals in a surrounding acoustical environment. For example, the wireless telephone may include one or more microphones that are configured to capture audio signals from one or more sound sources. However, it may be difficult for the wireless telephone to separate the audio signals during encoding. For example, it may be difficult for the wireless telephone to determine whether an audio signal is a foreground audio signal (e.g., an "important" audio signal) or a background audio signal (e.g., an "unimportant" audio signal). As a result, audio applications (at the wireless device or at a remote device) based on the captured audio signals may be compromised. As a non-limiting example, foreground audio signals and background audio signals may be encoded at similar bit-rates, which may compromise audio encoding efficiency.

III. SUMMARY

According to one implementation of the disclosed techniques, an apparatus for detecting a sound in an acoustical environment includes a microphone array configured to detect an audio signal in the acoustical environment. The apparatus also includes a processor configured to determine an angular location of a sound source of the audio signal. The angular location is relative to the microphone array. The processor is also configured to determine at least one reverberation characteristic of the audio signal. The processor is further configured to determine a distance, relative to the microphone array, of the sound source along an axis associated with the angular location based on the at least one reverberation characteristic.

According to another implementation of the disclosed techniques, a method for detecting a sound in an acoustical environment includes detecting, at a microphone array, an audio signal in the acoustical environment. The method also includes determining an angular location of a sound source of the audio signal. The angular location is relative to the microphone array. The method further includes determining at least one reverberation characteristic of the audio signal. The method also includes determining a distance, relative to the microphone array, of the sound source along an axis associated with the angular location based on the at least one reverberation characteristic.

According to another implementation of the disclosed techniques, a non-transitory computer-readable medium includes instructions for detecting a sound in an acoustical environment. The instructions, when executed by a processor, cause the processor to perform operations including determining an angular location of a sound source of an audio signal that is detected in the acoustical environment using a microphone array. The angular location is relative to the microphone array. The operations also include determining at least one reverberation characteristic of the audio signal and determining a distance of the sound source along an axis associated with the angular location based on the at least one reverberation characteristic. The distance is relative to the microphone array.

According to another implementation of the disclosed techniques, an apparatus for detecting a sound in an acoustical environment includes means for detecting an audio signal in the acoustical environment and means for determining an angular location of a sound source of the audio signal. The angular location is relative to the means for detecting. The apparatus also includes means for determining at least one reverberation characteristic of the audio signal and means for determining a distance of the sound source along an axis associated with the angular location based on the at least one reverberation characteristic. The distance is relative to the means for detecting.

According to another implementation of the disclosed techniques, an apparatus for detecting a sound in an acoustical environment includes a microphone array configured to detect an audio signal in the acoustical environment. The apparatus also includes a processor configured to determine a direct energy component of the audio signal and to determine a reverberation energy component of the audio signal. The processor is also configured to determine a distance of a sound source of the audio signal from the microphone array based on the direct energy component and the reverberation energy component. The processor is further configured to classify the audio signal as foreground audio or background audio based on the distance.

According to another implementation of the disclosed techniques, a method for detecting a sound in an acoustical environment includes detecting, at a microphone array, an audio signal in the acoustical environment. The method further includes determining, at a processor, a direct energy component of the audio signal and determining a reverberation energy component of the audio signal. The method also includes determining a distance of a sound source of the audio signal from the microphone array based on the direct energy component and the reverberation energy component. The method further includes classifying the audio signal as foreground audio or background audio based on the distance.

According to another implementation of the disclosed techniques, a non-transitory computer-readable medium includes instructions for detecting a sound in an acoustical environment. The instructions, when executed by a processor, cause the processor to perform operations including determining a direct energy component of an audio signal that is detected in the acoustical environment using a microphone array. The operations also include determining a reverberation energy component of the audio signal and determining a distance of a sound source of the audio signal from the microphone array based on the direct energy component and the reverberation energy component. The operations further include classifying the audio signal as foreground audio or background audio based on the distance.

According to another implementation of the disclosed techniques, an apparatus for detecting a sound in an acoustical environment includes means for detecting an audio signal in the acoustical environment and means for determining a direct energy component of the audio signal. The apparatus also includes means for determining a reverberation energy component of the audio signal and means for determining a distance of a sound source of the audio signal from the microphone array based on the direct energy component and the reverberation energy component. The apparatus also includes means for classifying the audio signal as foreground audio or background audio based on the distance.

According to another implementation of the disclosed techniques, an apparatus for detecting a sound in an acoustical environment includes a microphone array configured to detect one or more audio signals in the acoustical environment. The apparatus also includes a processor configured to determine at least one reverberation characteristic of the one or more audio signals in the acoustical environment. The processor is further configured to apply the one or more audio signals to a neural network to determine one or more neural network features. The processor is also configured to determine one or more characteristics of the acoustical environment based on the at least one reverberation characteristic and the one or more neural network features.

According to another implementation of the disclosed techniques, a method for detecting sound in an acoustical environment includes detecting, at a microphone, one or more audio signals in the acoustical environment. The method also includes determining, at a processor, at least one reverberation characteristic of the one or more audio signals in the acoustical environment. The method further includes applying the one or more audio signals to a neural network to determine one or more neural network features and determining one or more characteristics of the acoustical environment based on the at least one reverberation characteristic and the one or more neural network features.

According to another implementation of the disclosed techniques, a non-transitory computer-readable medium includes instructions for detecting a sound in an acoustical environment. The instructions, when executed by a processor, cause the processor to perform operations including determining at least one reverberation characteristic of one or more audio signals detected in the acoustical environment using a microphone. The operations also include applying the one or more audio signals to a neural network to determine one or more neural network features. The operations further include determining one or more characteristics of the acoustical environment based on the at least one reverberation characteristic and the one or more neural network features.

According to another implementation of the disclosed techniques, an apparatus for detecting a sound in an acoustical environment includes means for detecting one or more audio signals in the acoustical environment and means for determining at least one reverberation characteristic of the one or more audio signals in the acoustical environment. The apparatus also includes means for applying the one or more audio signals to a neural network to determine one or more neural network features and means for determining one or more characteristics of the acoustical environment based on the at least one reverberation characteristic and the one or more neural network features.

According to another implementation of the disclosed techniques, a method for detecting a sound in an acoustical environment includes detecting, at a microphone array, a first audio signal in the acoustical environment and a second audio signal in the acoustical environment. The first audio signal is from a first sound source, and the second audio signal is from a second sound source. The method also includes determining, at a processor, a first reverberation characteristic of the first audio signal in the acoustical environment and a second reverberation characteristic of the second audio signal in the acoustical environment. The method further includes determining a first distance between the first sound source and the microphone array based on the first reverberation characteristic and determining a second distance between the second sound source and the microphone array based on the second reverberation characteristic. The first sound source is located along a first axis associated with a first angular location relative to the microphone array, and the second sound source is located along a second axis associated with a second angular location relative to the microphone array.

According to another implementation of the disclosed techniques, an apparatus for detecting a sound in an acoustical environment includes a microphone array configured to detect a first audio signal in the acoustical environment and a second audio signal in the acoustical environment. The first audio signal is from a first sound source, and the second audio signal is from a second sound source. The apparatus also includes a processor configured to determine a first reverberation characteristic of the first audio signal in the acoustical environment and to determine a second reverberation characteristic of the second audio signal in the acoustical environment. The processor is further configured to determine a first distance between the first sound source and the microphone array based on the first reverberation characteristic and to determine a second distance between the second sound source and the microphone array based on the second reverberation characteristic. The first sound source is located along a first axis associated with a first angular location relative to the microphone array, and the second sound source is located along a second axis associated with a second angular location relative to the microphone array.

According to another implementation of the disclosed techniques, a non-transitory computer-readable medium includes instructions for detecting a sound in an acoustical environment. The instructions, when executed by a processor, cause the processor to perform operations including determining a first reverberation characteristic of a first audio signal in the acoustical environment and determining a second reverberation characteristic of a second audio signal in the acoustical environment. The first audio signal and the second audio signal are detected using a microphone array. The first audio signal is from a first sound source, and the second audio signal is from a second sound source. The operations also include determining a first distance between the first sound source and the microphone array based on the first reverberation characteristic and determining a second distance between the second sound source and the microphone array based on the second reverberation characteristic. The first sound source is located along a first axis associated with a first angular location relative to the microphone array, and the second sound source is located along a second axis associated with a second angular location relative to the microphone array.

According to another implementation of the present disclosure, an apparatus for detecting a sound in an acoustical environment includes means for detecting a first audio signal in the acoustical environment and a second audio signal in the acoustical environment. The first audio signal is from a first sound source, and the second audio signal is from a second sound source. The apparatus also includes means for determining a first reverberation characteristic of the first audio signal in the acoustical environment and a second reverberation characteristic of the second audio signal in the acoustical environment. The apparatus further includes means for determining a first distance between the first sound source and the means for detecting based on the first reverberation characteristic and means for determining a second distance between the second sound source and the means for detecting based on the second reverberation characteristic. The first sound source is located along a first axis associated with a first angular location relative to the means for detecting, and the second sound source is located along a second axis associated with a second angular location relative to the means for detecting.

IV. BRIEF DESCRIPTION OF THE DRAWINGS

V. DETAILED DESCRIPTION

Figure 1:
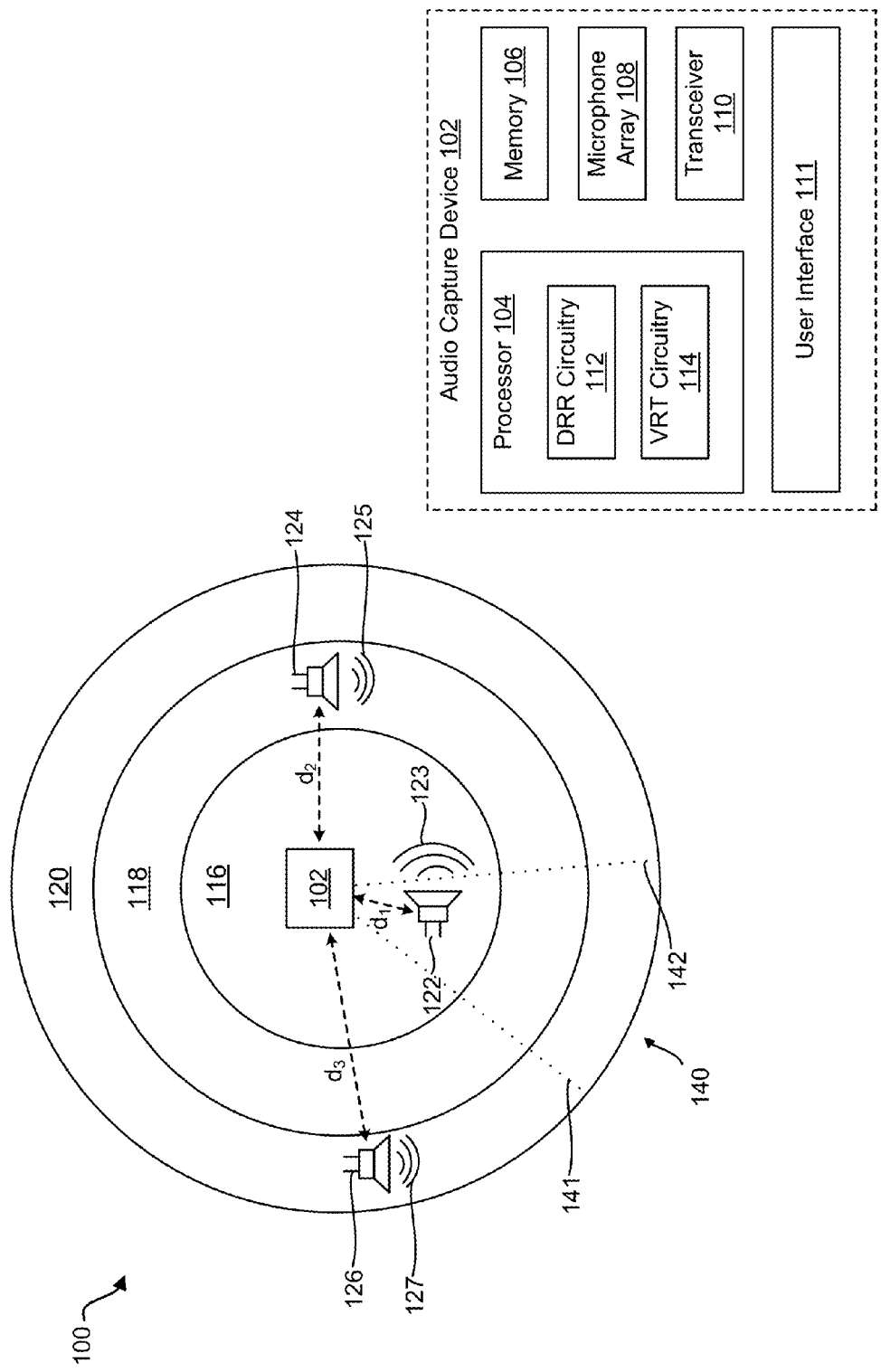
FIG. 1 is a diagram that depicts an audio capture device that is operable to detect a sound in an acoustical environment.

Referring to FIG. 1, an acoustical environment 100 is depicted. According to one implementation, the acoustical environment 100 may include a room, an outside auditorium, etc. An audio capture device 102 is located in the acoustical environment 100. The audio capture device 102 may be a wireless telephone or another mobile device that is configured to capture sound from one or more sound sources.

The audio capture device 102 includes a processor 104, a memory 106, a microphone array 108, and a transceiver 110. The memory 106 may include a non-transitory computer-readable medium that includes instructions executable by the processor 104. According to one implementation, the microphone array 108 may be a fixed microphone array. According to another implementation, the microphone array 108 may be a moving microphone array. For example, the microphone array 108 may be included in a robot, a headset, a mobile device, a manned or unmanned vehicle such as an automobile or aerial vehicle, etc. The transceiver 110 may be configured to transmit and receive data from one or more other devices (not shown). According to some implementations, the audio capture device 102 may include additional (or fewer) components. As a non-limiting example, the audio capture device 102 may include one or more speakers to output audio. The processor 104 includes direct-to-reverberation ratio (DRR) circuitry 112 and volume reduction time (VRT) circuitry 114.

The acoustical environment 100 includes a plurality of zones. For example, the acoustical environment 100 includes a first zone 116, a second zone 118, and a third zone 120. According to other implementations, the acoustical environment 100 may include additional zones. As a non-limiting example, the acoustical environment 100 may include five zones. The zones 116, 118, 120 of the acoustical environment 100 may include concentric circles having center points located at a center of a circular array of microphones. For example, the microphone array 108 may be a circular array of microphones, where each microphone is positioned to capture audio in a different direction. The first zone 116 is closer to the microphone array 108 than the second zone 118, and the second zone 118 is closer to the microphone array 108 than the third zone 120.

Although FIG. 1 depicts three zones 116, 118, 120 in the form of concentric circles, the techniques described herein may be applicable using zones with different geometries. As a non-limiting example, referring to FIG. 2, an acoustical environment 200 includes a first zone 216, a second zone 218, and a third zone 220. Each zone 216, 218, 220 of the acoustical environment 200 may include a rectangular section having a center point located at the microphone array 108. Thus, the techniques described with respect to FIG. 1 may also be applicable to the acoustical environment 200 of FIG. 2.

Referring back to FIG. 1, the processor 104 may be configured to determine an angular location of a sound source of an audio signal. The angular location may be relative to the microphone array 108. To illustrate, a first sound source 122 may be located at a first angular location (e.g., approximately 260 degrees) relative to the microphone array 108, a second sound source 124 may be located at a second angular location (e.g., approximately 3 degrees) relative to the microphone array 108, and a third sound source 126 may be located at a third angular location (e.g., approximately 190 degrees) relative to the microphone array 108. Although in some implementations angular location includes an angular coordinate (e.g., 260 degrees), in other implementations angular location may include a region between two angular coordinates, such as a region 140 between a first angular coordinate 141 (e.g., 230 degrees) and a second angular coordinate 142 (e.g., 275 degrees). The first sound source 122 may output a first audio signal 123 that is captured by the microphone array 108, the second sound source 124 may output a second audio signal 125 that is captured by the microphone array 108, and the third sound source 126 may output a third audio signal 127 that is captured by the microphone array 108.

Based on acoustic characteristics of the first audio signal 123, the processor 104 may determine the first angular location of the first sound source 122 relative to the microphone array 108. For example, the processor 104 may determine the first angular location based on a detected volume of the first audio signal 123, reverberation characteristics of the first audio signal 123, one or more other characteristics of the first audio signal 123, or a combination thereof. Similarly, based on acoustic characteristics of the second audio signal 125, the processor 104 may determine the second angular location of the second sound source 124 relative to the microphone array 108. In a similar manner, based on acoustic characteristics of the third audio signal 127, the processor 104 may determine the third angular location of the third sound source 126 relative to the microphone array 108.

The processor 104 may determine at least one reverberation characteristic of an audio signal in the acoustical environment 100. According to one implementation, the at least one reverberation characteristic may include a direct-to-reverberation ratio of the audio signal. As a non-limiting example, the processor 104 may determine direct-to-reverberation ratios of the audio signals 123, 125, 127. The DRR circuitry 112 may determine a direct energy component of the first audio signal 123 and a reverberation energy component of the first audio signal 123. As used herein, the "direct" energy component of a signal includes the energy level of the signal as detected from a first angular location (e.g., the highest energy level). According to some implementations, the direct energy component includes the energy level of the signal as detected from a "closest" microphone to the source of the signal. As used herein, the "reverberation" energy component of a signal includes the sum of the energy levels of the signal as detected from the other angular locations (e.g., the sum of each energy level other than the highest energy level). The direct-to-reverberation ratio is described in greater detail with respect to FIG. 3. Upon determining the direct energy component of the first audio signal 123 and the reverberation energy component of the first audio signal 123, the DRR circuitry 112 may determine a first direct-to-reverberation ratio of the first audio signal 123. For example, the first direct-to-reverberation ratio may be computed by dividing the direct energy component of the first audio signal 123 by the reverberation energy component of the first audio signal 123. Based on the first direct-to-reverberation ratio, the DRR circuitry 112 may determine a distance ($d_1$) between the first sound source 122 and the microphone array 108. For example, the DRR circuitry 112 may determine the distance ($d_1$) of the first sound source 122 along an axis associated with the first angular location based on the at least one reverberation characteristic (e.g., the first direct-to-reverberation ratio). The axis may be along the direction indicted in FIG. 1 for the distance $d_1$. In other implementations, the axis may correspond to an angular coordinate within the region 140, such as 252.5 degrees (e.g., centered between the first angular coordinate 141 and the second angular coordinate 142).

Additionally or in the alternative, the DRR circuitry 112 may determine the direct energy component of the second audio signal 125 and the reverberation energy component of the second audio signal 125. Upon determining the direct energy component of the second audio signal 125 and the reverberation energy component of the second audio signal 125, the DRR circuitry 112 may determine a second direct-to-reverberation ratio of the second audio signal 125. For example, the second direct-to-reverberation ratio may be computed by dividing the direct energy component of the second audio signal 125 by the reverberation energy component of the second audio signal 125. Based on the second direct-to-reverberation ratio, the DRR circuitry 112 may determine a distance ($d_2$) between the second sound source 124 and the microphone array 108. For example, the DRR circuitry 112 may determine the distance ($d_2$) of the second sound source 124 along an axis associated with the second angular location based on the at least one reverberation characteristic (e.g., the second direct-to-reverberation ratio).

In a similar manner, the DRR circuitry 112 may determine the direct energy component of the third audio signal 127 and the reverberation energy component of the third audio signal 127. Upon determining the direct energy component of the third audio signal 127 and the reverberation energy component of the third audio signal 127, the DRR circuitry 112 may determine a third direct-to-reverberation ratio of the third audio signal 127. For example, the third direct-to-reverberation ratio may be computed by dividing the direct energy component of the third audio signal 127 by the reverberation energy component of the third audio signal 127. Based on the second direct-to-reverberation ratio, the DRR circuitry 112 may determine a distance ($d_3$) between the third sound source 126 and the microphone array 108. For example, the DRR circuitry 112 may determine the distance ($d_3$) of the third sound source 126 along an axis associated with the third angular location based on the at least one reverberation characteristic (e.g., the third direct-to-reverberation ratio).

According to another implementation, the at least one reverberation characteristic may include a volume reduction time of the audio signal. The volume reduction time may correspond to an amount of time for a volume of the audio signal to decrease by a particular percentage. For example, the volume reduction time may correspond to an amount of time for the volume of the audio signal to decrease by sixty percent (e.g., "T60"). To illustrate, the VRT circuitry 114 may determine a first volume reduction time of the first audio signal 123 (e.g., the amount of time for the volume of the first audio signal 123 to reduce by sixty percent). Based on the first volume reduction time, the VRT circuitry 114 may determine the distance ($d_1$) between the first sound source 122 and the microphone array 108. For example, the VRT circuitry 114 may determine the distance ($d_1$) of the first sound source 122 along an axis associated with the first angular location based on the at least one reverberation characteristic (e.g., the first volume reduction time). To illustrate, if the first volume reduction time is relatively large, the distance ($d_1$) is relatively short. However, if the first volume reduction time is relatively small, the distance ($d_1$) is relatively long.

Additionally, or in the alternative, the VRT circuitry 114 may determine a second volume reduction time of the second audio signal 125 (e.g., the amount of time for the volume of the second audio signal 125 to reduce by sixty percent). Based on the second volume reduction time, the VRT circuitry 114 may determine the distance ($d_2$) between the second sound source 124 and the microphone array 108. For example, the VRT circuitry 114 may determine the distance ($d_2$) of the second sound source 124 along an axis associated with the second angular location based on the at least one reverberation characteristic (e.g., the second volume reduction time).

In a similar manner, the VRT circuitry 114 may determine a third volume reduction time of the third audio signal 127 (e.g., the amount of time for the volume of the third audio signal 127 to reduce by sixty percent). Based on the third volume reduction time, the VRT circuitry 114 may determine the distance ($d_3$) between the third sound source 126 and the microphone array 108. For example, the VRT circuitry 114 may determine the distance ($d_3$) of the third sound source 126 along an axis associated with the third angular location based on the at least one reverberation characteristic (e.g., the third volume reduction time).

The processor 104 may also be configured to determine, based on the angular location and the distance, whether a particular sound source is located in the first zone 116, the second zone 118, or the third zone 120. For example, the processor 104 may determine the first sound source 122 is located in the first zone 116 based on the distance ($d_1$) between the first sound source 122 and the microphone array 108 and based on the first angular location of the first sound source 122 (relative to the microphone array 108). In a similar manner, the processor 104 may determine the second sound source 124 is located in the second zone 118 based on the distance ($d_2$) between the second sound source 124 and the microphone array 108 and based on the second angular location of the second sound source 124 (relative to the microphone array 108). The processor 104 may also determine the third sound source 126 is located in the third zone 120 based on the distance ($d_3$) between the third sound source 126 and the microphone array 108 and based on the third angular location of the third sound source 126 (relative to the microphone array 108).

The audio capture device 102 may also include a user interface 111. The user interface 111 may be configured to display a location of a particular sound source relative to the microphone array 108 (e.g., relative to a location of the audio capture device 102). The location of the particular sound source may be based on the angular location of the particular sound source relative to the microphone array 108 and the distance of the particular sound source along an axis associated with the angular location. To illustrate, the user interface 111 may display the location of each sound source 122, 124, 126 relative to the location of the microphone array 108. According to one implementation, the user interface 111 may also display a visual representation of the first zone 116, the second zone 118, and the third zone 120 such that the location of the sound sources 122, 124, 126 within the respective zones 116, 118, 120 may be readily identifiable to a user.

According to some implementations, the processor 104 may be configured to determine boundaries of one or more of the zones 116, 118, 118 based on detected acoustic characteristics (e.g., direct-to-reverberation ratios and volume reduction times) of audio signals generated in each zone. To illustrate, the processor 104 may determine first boundaries of the first zone 116 based on detected acoustics characteristics of first audio signals generated in the first zone 116, determine second boundaries of the second zone 118 based on detected acoustic characteristics of second audio signals generated in the second zone 118, and determine third boundaries of the third zone 120 based on detected acoustic characteristics of third audio signals generated in the third zone 120. For example, the DRR circuitry 112 may set the first direct-to-reverberation threshold, the second direct-to-reverberation threshold, and the third direct-to-reverberation threshold based on a collected set of direct-to-reverberation ratios from audio signals in the acoustical environment 100. The DRR circuitry 112 may determine the highest direct-to-reverberation ratio of a detected audio signal and a lowest direct-to-reverberation ratio of a detected audio signal. Based on the highest and lowest direct-to-reverberation ratios, the processor 104 may determine the direct-to-reverberation thresholds based on the number of zones to be established. The number of zones to be established may be based on user input. Similar techniques may be used to determine the boundaries using volume reduction times.

As described above, the processor 104 may compare the direct energy component of the audio signals 123, 125, 127 to the reverberation component of the audio signals 123, 125, 127 to determine the distance ($d_1$, $d_2$, $d_3$) between the sound sources 122, 124, 126, respectively, and the microphone array 108. Based on the distances ($d_1$, $d_2$, $d_3$), the processor 104 may classify the audio signals 123, 125, 127 as foreground audio or background audio. To illustrate, because the distance ($d_1$) between the first sound source 122 and the microphone array 108 is relatively small (e.g., fails to satisfy a distance threshold), the processor 104 may classify the first audio signal 123 as foreground audio. Because the distance ($d_3$) between the third sound source 126 and the microphone array 108 is relatively large (e.g., satisfies the distance threshold), the processor 104 may classify the third audio signal 127 as background audio. In a similar manner, the processor 104 may determine whether the second audio signal 125 is foreground audio or background audio based on a comparison of the distance ($d_2$) between the second sound source 124 and the microphone array 108 to the distance threshold.

The processor 104 may be configured to allocate a first number of bits to the first audio signal 123 for an encoding operation if the first audio signal 123 is classified as foreground audio and configured to allocate a second number of bits to the third audio signal 127 for the encoding operation if the third audio signal 127 is classified as background audio. As used herein, "allocating" a number of bits to an audio signal corresponds to using the number of bits to encode the audio signal. The second number of bits may be less than the first number of bits. The processor 104 may encode a data packet during the encoding operation to generate an encoded data packet. The first number of bits may be used in the encoded data packet to encode the first audio signal 123 if the first audio signal 123 is classified as foreground audio, and the second number of bits may be used in the encoded data packet to encode the third audio signal 127 if the third audio signal 127 is classified as background audio. The transceiver 110 may be configured to transmit the encoded data packet to a remote device. The encoded data packet may include a section indicating the number of bits used to encode the audio signals 123, 127.

The techniques described with respect to FIG. 1 may enable the audio capture device 102 to determine the proximity and locations of the sound sources 122, 124, 126 in the acoustical environment 100 to the one or more microphones based on reverberation characteristics (e.g., direct-to-reverberation ratios, volume reduction times, or both). Determining the proximity of the sound sources 122, 124, 126 may enable the processor 104 to encode audio signals from closer sound sources (e.g., foreground audio signals) at higher bit-rates and audio signal from sound sources farther away (e.g., background audio signals) at lower bit-rates for encoding efficiency. For example, if the audio capture device 102 classifies the first audio signal 123 as foreground audio, a relatively large number of bits may be allocated to the first audio signal 123 for encoding to achieve high-accuracy audio encoding. However, if the audio capture device 102 classifies the third audio signal 127 as background audio, a relatively low number of bits may be allocated to the third audio signal 127 for encoding because the third audio signal 127 may be deemed as "less important".

Figure 3:
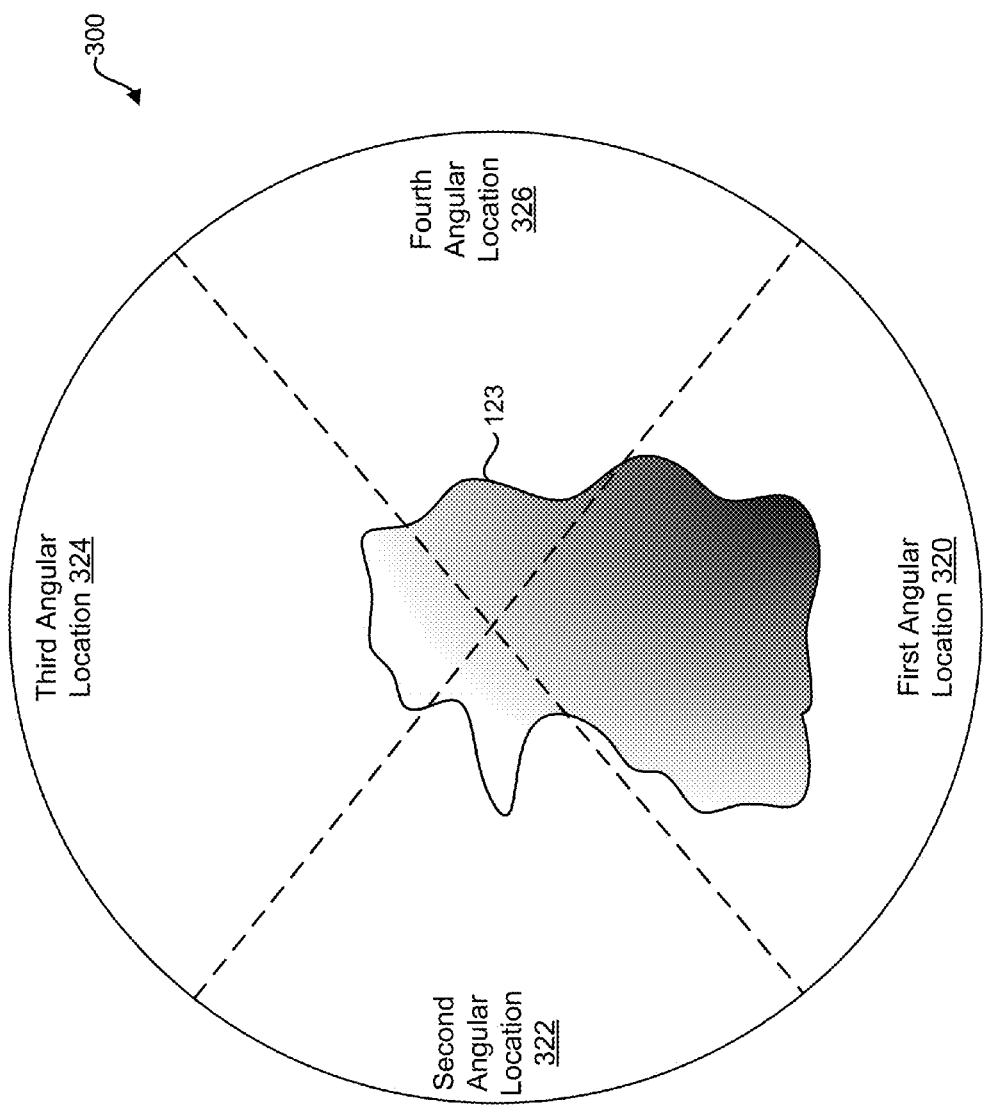
FIG. 3 illustrates a technique for determining reverberation characteristics at different angular locations.

Referring to FIG. 3, a diagram 300 illustrates a technique for determining a reverberation characteristic of the first audio signal 123. According to the diagram 300, energy components (e.g., levels) of the first audio signal 123 are detected at different angular locations with respect to the microphone array 108 of FIG. 1. For example, the diagram 300 illustrates a first angular location 320, a second angular location 322, a third angular location 324, and a fourth angular location 326. Although four angular locations 320, 322, 324, 326 are depicted in FIG. 3, in other implementations, energy components of the first audio signal 123 may be detected in additional (or fewer) angular locations. According to one implementation, the sum of the angular locations 320, 322, 324, 326 may span 360 degrees. As a non-liming example, each angular location 320, 322, 324, 326 may span 90 degrees.

The processor 104 of FIG. 1 may determine one or more reverberation characteristics at one or more different angular locations 320, 322, 324, 326 relative to the microphone array 108 to determine the angular location of the first audio signal 123. As a non-limiting example, the DRR circuitry 112 may determine a reverberation characteristic of the first audio signal 123 for, or with respect to, each angular location 320, 322, 324, 326.

To illustrate, the DRR circuitry 112 may determine a first reverberation characteristic of the first audio signal 123. The first reverberation characteristic may be determined when a direct energy component of the first audio signal 123 is measured at the first angular location 320. For example, the first reverberation characteristic may be computed by dividing a first energy level of the first audio signal 123 at the first angular location 320 by the sum of the energy levels of the first audio signal 123 at the other angular locations 322, 324, 326. In a similar manner, the DRR circuitry 112 may determine a second reverberation characteristic of the first audio signal 123. The second reverberation characteristic may be determined when a direct energy component of the first audio signal 123 is measured at the second angular location 322. For example, the second reverberation characteristic may be computed by dividing a second energy level of the first audio signal 123 at the second angular location 322 by the sum of the energy levels of the first audio signal 123 at the other angular locations 320, 324, 326. Similar techniques may be implemented to determine the third and fourth reverberation characteristics of the first audio signal 123 when the direct energy component of the first audio signal 123 is measured at the third and fourth angular locations 324, 326, respectively.

The processor 104 may select determine the reverberation characteristic of the first audio signal 123 and/or the angular location of the first sound source 122 based on the magnitude of the computed reverberation characteristics at each angular location 320, 322, 324, 326. For example, the reverberation characteristic that has the highest magnitude may be used to determine the angular location of the first of the first sound source 122 and the reverberation characteristic of the first audio signal 123. To illustrate, the processor 104 may determine that the magnitude of the direct energy component is largest with respect to the first angular location 320. Thus, the processor 104 may determine that the first sound source 122 is located along an axis associated with the first angular location 320 and that the direct-to-reverberation ratio of the first audio signal 123 has a direct energy component directed towards the first angular location 320.

Figure 4:
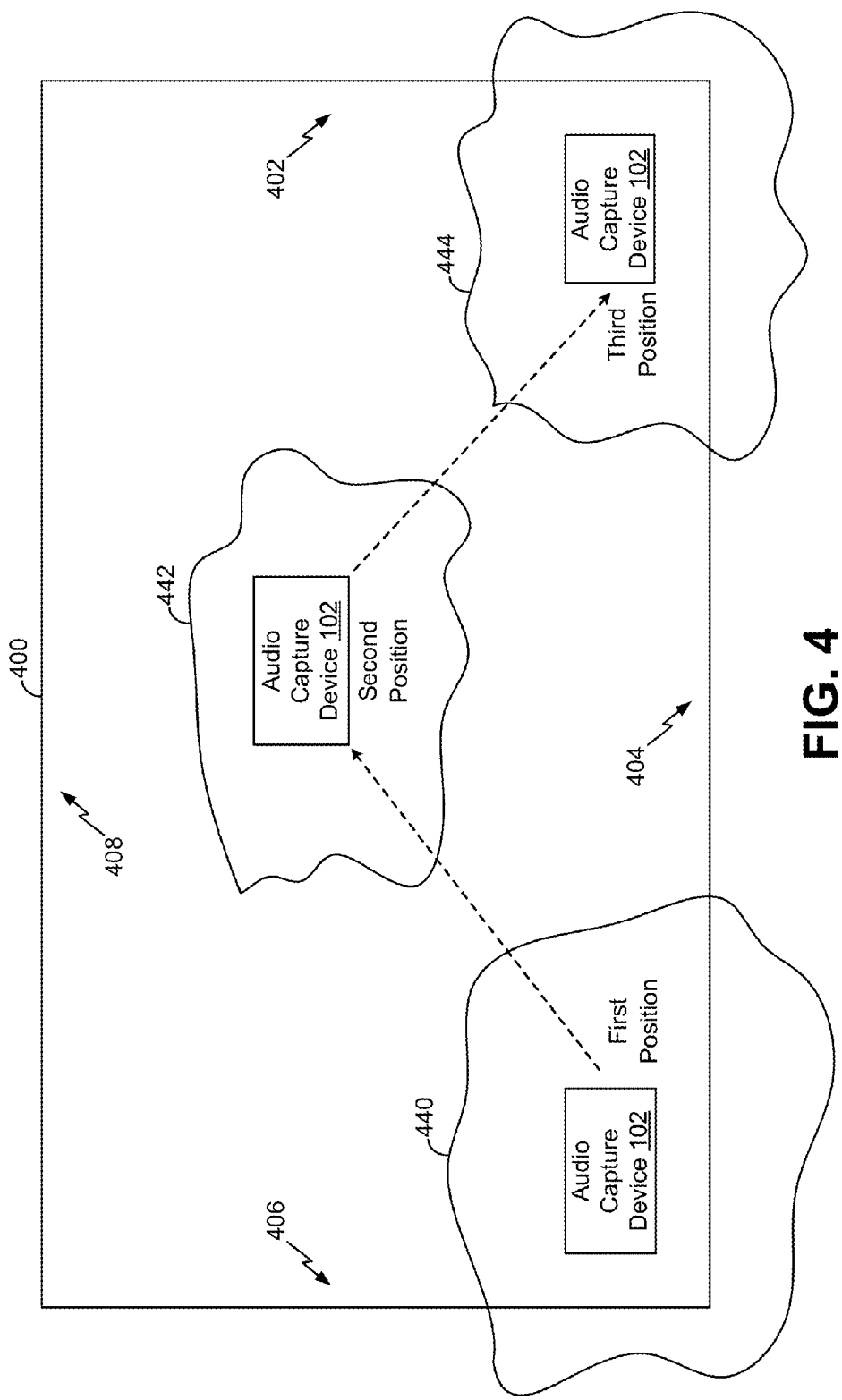
FIG. 4 illustrates a technique for determining a location of a microphone array in an acoustical environment based on reverberation characteristics.

Referring to FIG. 4, an acoustical environment 400 is depicted. According to one implementation, the acoustical environment 400 may include a room enclosed by walls 402, 404, 406, 408. The acoustical environment 400 includes the audio capture device 102. According to FIG. 4, the audio capture device 102 may move from a first position in the lower left corner of the acoustical environment 400 to a second position near the center the acoustical environment 400. The audio capture device 102 may also move from the second position to a third position in the lower right corner of the acoustical environment 400. Thus, the audio capture device 102 may be included in a moving object, such as a robot, a headset, a mobile device, a vehicle, etc.

At the first position, the audio capture device 102 may detect one or more audio signals in the acoustical environment 400. In a similar manner as described with respect to FIG. 3, the audio capture device 102 may determine a direct-to-reverberation ratio of the audio signals. Based on the direct-to-reverberation ratio, the audio capture device 102 may determine the direction (or region) having the largest "direct component" (e.g., the highest direct-to-reverberation ratio) and the directions having large "reverberation components" (e.g., lower direct-to-reverberation ratios). The audio capture device 102 may detect relatively large sound reflections 440 towards the left and towards the bottom and relatively small sound reflections 440 towards the top and towards the right. Based on the sound reflections 440, the audio capture device 102 may determine that it is in (or near) a lower left corner of the acoustical environment 400 (e.g., near the walls 404, 406), near furniture, etc. For example, the microphone array 108 may be located near the corner of the acoustical environment 400 if a first direct-to-reverberation ratio (having a direct component facing the center of the acoustical environment 400) of the audio capture device 102 is substantially different from a second direct-to-reverberation ratio (having a direct component facing the wall 406) of the audio capture device 102.

At the second position, the audio capture device 102 may also detect one or more audio signals in the acoustical environment 400. The audio capture device 102 may detect substantially similar sound reflections 442 all around the audio capture device 102. Based on the sound reflections 442, the audio capture device 102 may determine that it is in (or near) the center of the acoustical environment 400. For example, the microphone array 108 may be located near the center of the acoustical environment 400 if a first direct-to-reverberation ratio (having a direct component facing the lower left corner of the acoustical environment 400) of the audio capture device 102 is not substantially different from a second direct-to-reverberation ratio (having a direct component facing the lower right corner of the acoustical environment 400) of the audio capture device 102.

At the third position, the audio capture device 102 may detect one or more audio signals in the acoustical environment 400. The audio capture device 102 may detect relatively large sound reflections 444 towards the right and towards the bottom and relatively small sound reflections 444 towards the top and towards the left. Based on the sound reflections 444, the audio capture device 102 may determine that it is in (or near) a lower right corner of the acoustical environment 400 (e.g., near the walls 402, 404).

The techniques described with respect to FIG. 4 may enable the audio capture device 102 to determine a location of the microphone array 108 in the acoustical environment 400 based on a reverberation characteristic (e.g., a direct-to-reverberation ratio).

Figure 5:
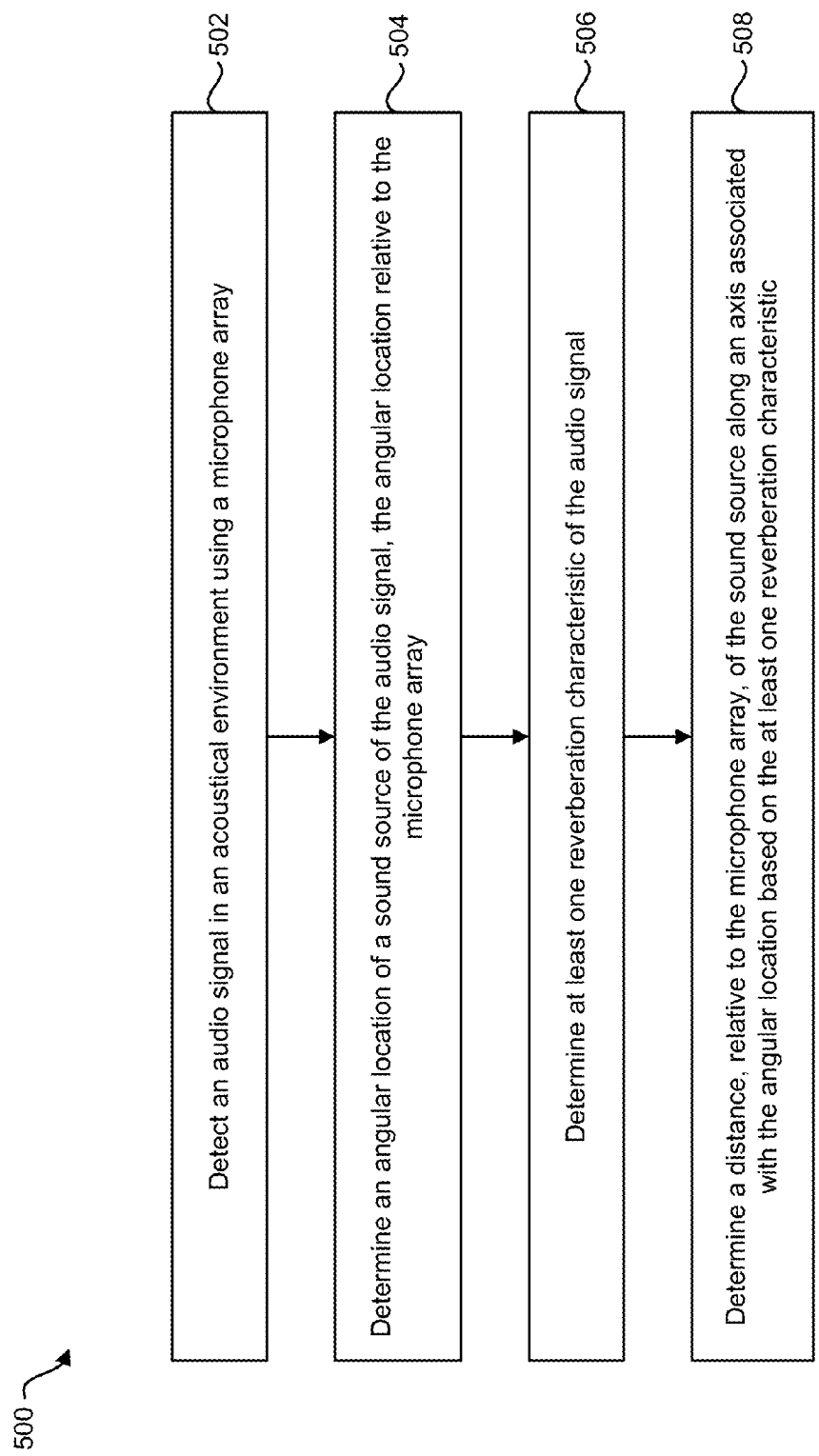
FIG. 5 is a flowchart illustrating a method for detecting a sound in an acoustical environment.

Referring to FIG. 5, a flowchart illustrating a method 500 for detecting a sound in an acoustical environment is depicted. The method 500 may be performed using the audio capture device 102 of FIGS. 1, 2, and 4.

The method 500 includes detecting an audio signal in an acoustical environment using a microphone array, at 502. For example, referring to FIG. 1, the microphone array 108 may detect the first audio signal 123 in the acoustical environment 100. The first audio signal 123 may be generated by the first sound source 122.

The method 500 also includes determining an angular location of a sound source of the audio signal, at 504. The angular location may be relative to the microphone array. For example, referring to FIG. 1, the processor 104 may determine the first angular location of the first sound source 122 relative to the microphone array 108. To illustrate, based on acoustic characteristics of the first audio signal 123, the processor 104 may determine the first angular location of the first sound source 122 relative to the microphone array 108. For example, the processor 104 may determine the first angular location based on a detected volume of the first audio signal 123, and reverberation characteristics of the first audio signal 123.

The method 500 also includes determining at least one reverberation characteristic of the audio signal, at 506. For example, referring to FIG. 1, the DRR circuitry 112 may determine the direct energy component of the first audio signal 123 and the reverberation energy component of the first audio signal 123. Upon determining the direct energy component of the first audio signal 123 and the reverberation energy component of the first audio signal 123, the DRR circuitry 112 may determine a first direct-to-reverberation ratio of the first audio signal 123. For example, the first direct-to-reverberation ratio may be computed by dividing the direct energy component of the first audio signal 123 by the reverberation energy component of the first audio signal 123.

The method 500 also includes determining, relative to the microphone array, a distance of the sound source along an axis associated with the angular location based on the at least one reverberation characteristic, at 508. For example, referring to FIG. 1, based on the first direct-to-reverberation ratio, the DRR circuitry 112 may determine the distance ($d_1$) between the first sound source 122 and the microphone array 108. The DRR circuitry 112 may determine the distance ($d_1$) of the first sound source 122 along an axis associated with the first angular location based on the at least one reverberation characteristic (e.g., the first direct-to-reverberation ratio).

According to one implementation of the method 500, the processor 104 may determine one or more reverberation characteristics at one or more different angular locations relative to the microphone array 108 to determine the at least one reverberation characteristic. For example, referring to FIG. 3, the processor 104 may determine direct-to-reverberation ratios of the first audio signal 123, volume reduction times of the first audio signal 123, or both, at the different angular locations 320, 322, 324, 326 and select the "at least one reverberation characteristic" according to the method 500 based on the angular location 320, 322, 324, 326 that yields the "largest" direct-to-reverberation ratio or the largest volume reduction time. The different angular locations 320, 322, 324, 326 may span 360 degrees. However, in other implementations, angular locations may span other ranges (e.g., 180 degrees, 90 degrees, 45 degrees, 15 degrees, etc.).

According to one implementation of the method 500, the at least one reverberation characteristic may include a direct-to-reverberation ratio of the audio signal. According to another implementation of the method 500, the at least one reverberation characteristic may include a volume reduction time of the audio signal. The volume reduction time may correspond to an amount of time for a volume of the audio signal to decrease by a particular percentage. For example, the volume reduction time may correspond to the amount of time for the volume of the audio signal to decrease by sixty percent.

According to one implementation, the method 500 may include determining, based on the angular location and the distance, whether the sound source is located in a first zone of the acoustical environment, a second zone of the acoustical environment, or a third zone of the acoustical environment. For example, referring to FIG. 1, the processor 104 may determine whether the first sound source 122 is located in the first zone 116, the second zone 118, or the third zone 120. The first zone 116 may be closer to the microphone array 108 than the second zone 118, and the second zone 118 may be closer to the microphone array 108 than the third zone 120.

Figure 2:
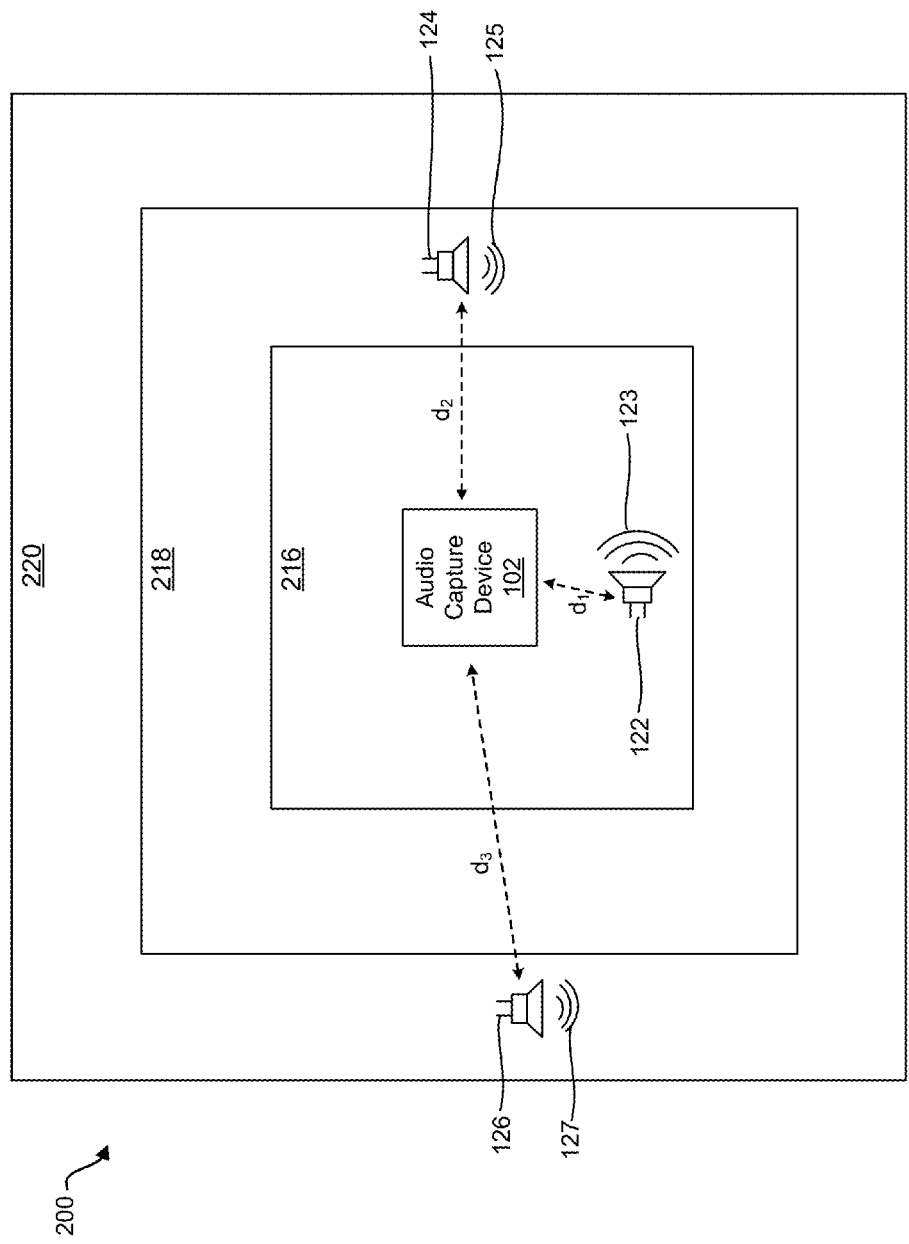
FIG. 2 is another diagram that depicts the audio capture device of FIG. 1.

According to one implementation of the method 500, a user interface may display a location of the sound source relative to the microphone array. The location may be based on the angular location and the distance. The user interface, such as the user interface 111 of FIG. 1, may also display a visual representation of the first zone 116, the second zone 118, and the third zone 120. As illustrated in FIG. 1, the first zone 116, the second zone 118, and the third zone 120 may include concentric circles having center points located at the microphone array 108. As illustrated in FIG. 2, each zone 216, 218, 220 includes a rectangular section having a center point located at the microphone array 108.

According to another implementation, the method 500 may include determining a location of the microphone array in the acoustical environment based on the at least one reverberation characteristic. The microphone array may be included in a robot, a headset, a mobile device, a manned or unmanned vehicle, etc. For example, referring to FIG. 4, the processor 104 may determine the location of the audio capture device 102 (e.g., the location of the microphone array 108) in the acoustical environment 400 based on the reverberation characteristics (e.g., direct-to-reverberation ratios and/or volume reduction times).

The method 500 of FIG. 5 may enable the audio capture device 102 to determine the proximity and locations of the sound sources 122, 124, 126 in the acoustical environment 100 to the one or more microphones based on reverberation characteristics (e.g., direct-to-reverberation ratios, volume reduction times, or both).

Figure 6:
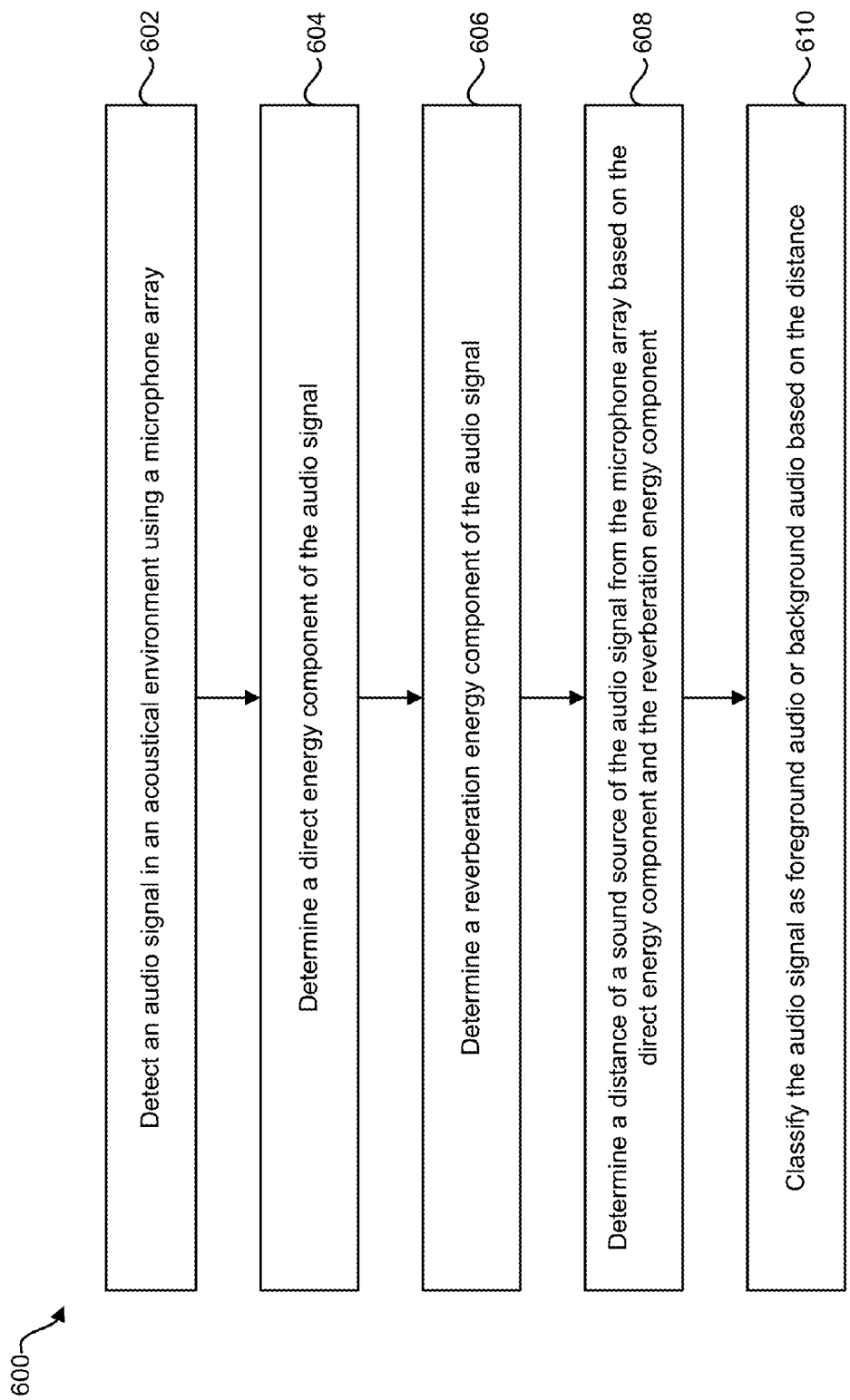
FIG. 6 is another flowchart illustrating a method for detecting a sound in an acoustical environment.

Referring to FIG. 6, a flowchart illustrating a method 600 for detecting a sound in an acoustical environment is depicted. The method 600 may be performed using the audio capture device 102 of FIGS. 1, 2, and 4.

The method 600 includes detecting an audio signal in an acoustical environment using a microphone array, at 602. For example, referring to FIG. 1, the microphone array 108 may detect the first audio signal 123 in the acoustical environment 100. The first audio signal 123 may be generated by the first sound source 122.

The method 600 also includes determining a direct energy component of the audio signal, at 604. For example, referring to FIG. 1, the DRR circuitry 112 may determine the direct energy component of the first audio signal 123. The method 600 also includes determining a reverberation energy component of the audio signal, at 606. For example, referring to FIG. 1, the DRR circuitry 112 may determine the reverberation energy component of the first audio signal 123.

The method 600 also includes determining a distance of a sound source of the audio signal from the microphone array based on the direct energy component and the reverberation energy component, at 608. For example, referring to FIG. 1, the processor 104 may compare the direct energy component of the audio signals 123, 125, 127 to the reverberation component of the audio signals 123, 125, 127 to determine the distance ($d_1$, $d_2$, $d_3$) between the sound sources 122, 124, 126, respectively, and the microphone array 108.

The method 600 also includes classifying the audio signal as foreground audio or background audio based on the distance, at 610. For example, referring to FIG. 1, based on the distances ($d_1$, $d_2$, $d_3$), the processor 104 may classify the audio signals 123, 125, 127 as foreground audio or background audio. To illustrate, because the distance ($d_1$) between the first sound source 122 and the microphone array 108 is relatively small (e.g., fails to satisfy a distance threshold), the processor 104 may classify the first audio signal 123 as foreground audio. Because the distance ($d_3$) between the third sound source 126 and the microphone array 108 is relatively large (e.g., satisfies the distance threshold), the processor 104 may classify the third audio signal 127 as background audio. In a similar manner, the processor 104 may determine whether the second audio signal 125 is foreground audio or background audio based on a comparison of the distance ($d_2$) between the second sound source 124 and the microphone array 108 to the distance threshold.

According to one implementation, the method 600 may include allocating a first number of bits to the audio signal for an encoding operation if the audio signal is classified as foreground audio. The method 600 may also include allocating a second number of bits to the audio signal for the encoding operation if the audio signal is classified as background audio. The second number of bits may be less than the first number of bits. The method 600 may also include encoding a data packet during the encoding operation to generate an encoded data packet. The first number of bits may be used in the encoded data packet to encode the audio signal if the audio signal is classified as foreground audio. The second number of bits may be used in the encoded data packet to encode the audio signal if the audio signal is classified as background audio. A transmitter may be configured to transmit the encoded data packet to a remote device.

The method 600 of FIG. 6 may enable the audio capture device 102 to determine the proximity and locations of the sound sources 122, 124, 126 in the acoustical environment 100 to the one or more microphones based on reverberation characteristics (e.g., direct-to-reverberation ratios, volume reduction times, or both). Determining the proximity of the sound sources 122, 124, 126 may enable the processor 104 to encode audio signals from closer sound sources (e.g., foreground audio signals) at higher bit-rates for higher quality (e.g., more accurate reproduction) and audio signal from sound sources farther away (e.g., background audio signals) at lower bit-rates for higher encoding efficiency. For example, if the audio capture device 102 classifies the first audio signal 123 as foreground audio, a relatively large number of bits may be allocated to the first audio signal 123. However, if the audio capture device 102 classifies the third audio signal 127 as background audio, a relatively low number of bits may be allocated to the third audio signal 127 for encoding because the third audio signal 127 may be deemed as "less important".

Figure 7:
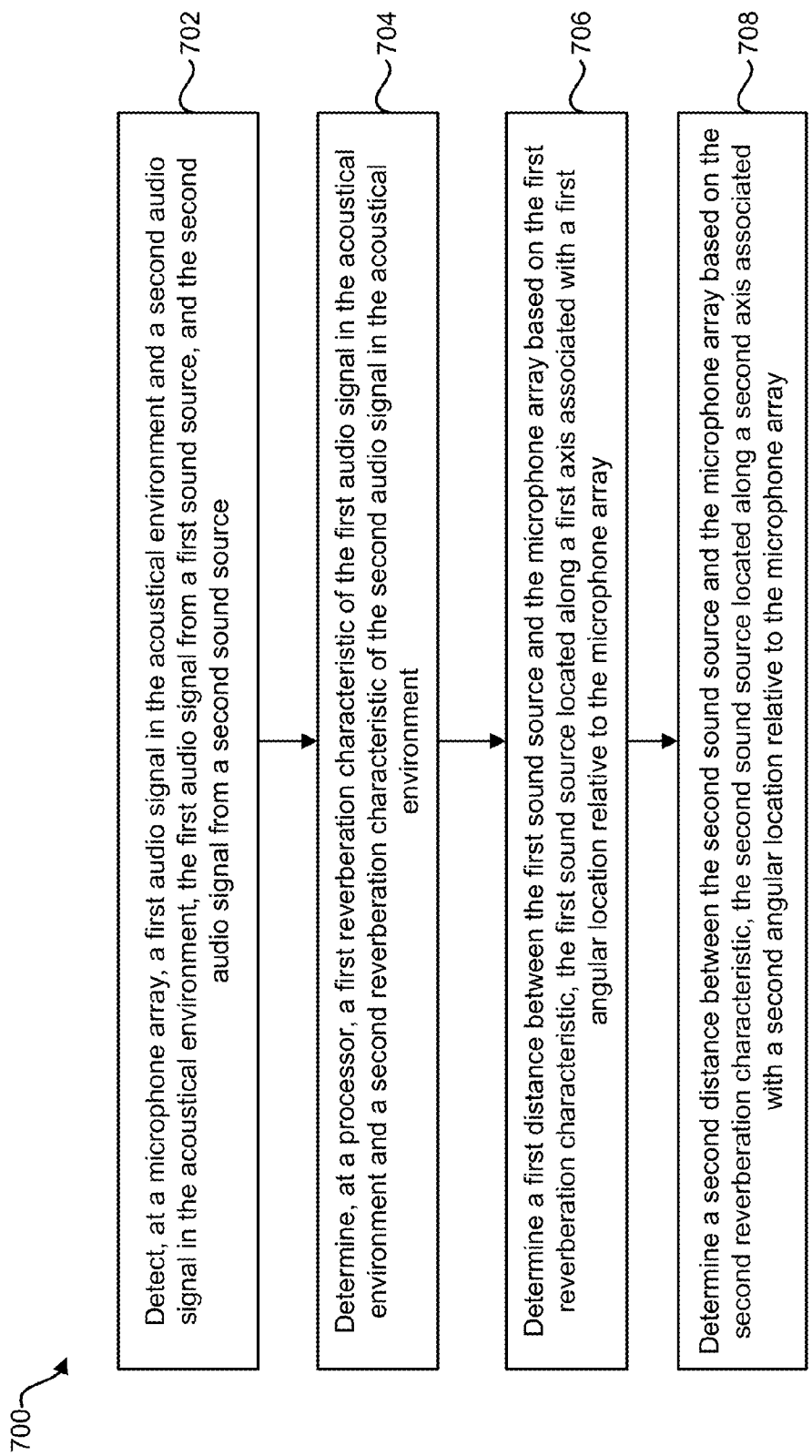
FIG. 7 is another flowchart illustrating a method for detecting a sound in an acoustical environment.

Referring to FIG. 7, a flowchart illustrating a method 700 for detecting a sound in an acoustical environment is depicted. The method 700 may be performed using the audio capture device 102 of FIGS. 1, 2, and 4.

The method 700 includes detecting, at a microphone array, a first audio signal in the acoustical environment and a second audio signal in the acoustical environment, at 702. The first audio signal may be from a first sound source, and the second audio signal may be from a second sound source. For example, referring to FIG. 1, the microphone array 108 may detect the first audio signal 123 in the acoustical environment 100 and may detect the second audio signal 125 in the acoustical environment 100. The first audio signal 123 may be from (e.g., generated by) the first sound source 122, and the second audio signal 125 may be from (e.g., generated by) the second sound source 124.

The method 700 also includes determining, at a processor, a first reverberation characteristic of the first audio signal in the acoustical environment and a second reverberation characteristic of the second audio signal in the acoustical environment, at 704. For example, referring to FIG. 1, the processor 104 may determine a first reverberation characteristic of the first audio signal 123 and a second reverberation characteristic of the second audio signal 125.

The method 700 also includes determining a first distance between the first sound source and the microphone array based on the first reverberation characteristic, at 706. The first sound source may be located along a first axis associated with a first angular location relative to the microphone array. For example, referring to FIG. 1, based on the first direct-to-reverberation ratio (e.g., the "first reverberation characteristic"), the DRR circuitry 112 may determine the distance ($d_1$) between the first sound source 122 and the microphone array 108. The DRR circuitry 112 may determine the distance ($d_1$) of the first sound source 122 along an axis associated with the first angular location based on the first reverberation characteristic.

The method 700 also includes determining a second distance between the second sound source and the microphone array based on the second reverberation characteristic, at 708. The second sound source may be located along a second axis associated with a second angular location relative to the microphone array. For example, referring to FIG. 1, based on the second direct-to-reverberation ratio (e.g., the "second reverberation characteristic"), the DRR circuitry 112 may determine the distance ($d_2$) between the second sound source 124 and the microphone array 108. The DRR circuitry 112 may determine the distance ($d_2$) of the second sound source 124 along an axis associated with the second angular location based on the second reverberation characteristic.

According to one implementation, the method 700 includes performing speaker recognition to identify first audio signals from the first sound source and second audio signal from the second source using a speech acoustic model. For example, referring to FIG. 1, the memory 106 may store a speech acoustic model that is accessible to the processor 104. The speech acoustic model may indicate first audio characteristics of sound from the first sound source 122 and second audio characteristics of sound from the second sound source 124. The processor 104 may identify first audio signals from the first sound source 122 based on the first audio characteristics in the speech acoustic model, and the processor 104 may identify second audio signals from the second sound source 124 based on the second audio characteristics in the speech acoustic model.

According to one implementation, the method 700 may also include detecting, at the microphone array, one or more additional audio signals from the first sound source. The method 700 may also include determining, at the processor, one or more additional reverberation characteristics of the one or more additional audio signals and tracking a change in location of the first sound source based on a comparison between the first reverberation characteristic and the one or more additional reverberation characteristics.

The method 700 of FIG. 7 may enable the audio capture device 102 to determine the proximity and locations of the sound sources 122, 124, 126 in the acoustical environment 100 to the one or more microphones based on reverberation characteristics (e.g., direct-to-reverberation ratios, volume reduction times, or both).

Figure 8:
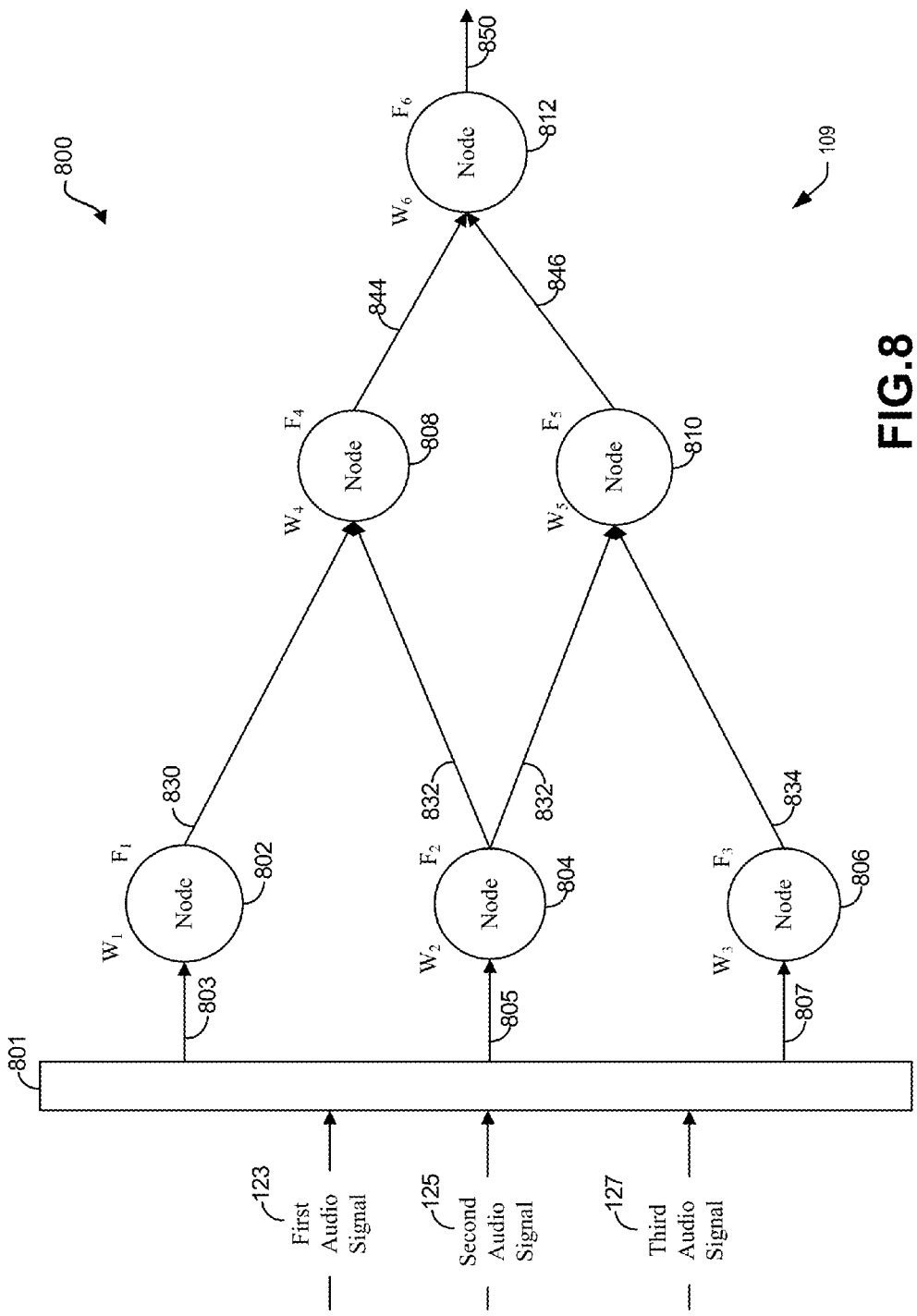
FIG. 8 illustrates a neural network for determining a neural network feature based on one or more audio signals.

Referring to FIG. 8, a diagram of a neural network 800 that may be implemented at the audio capture device 102 (e.g., at the processor 104) is shown. The neural network 800 includes a processing network 801 and multiple nodes 802, 804, 806, 808, 810, 812. The processor 104 of FIG. 1 may apply data corresponding to the audio signals 123, 125, 127 to the neural network 800 to determine one or more neural network features.

For example, the processor 104 may provide the data corresponding to the audio signals 123, 125, 127 to the processing network 801. The processing network 801 may generate vectors 803, 805, 807 based on the audio signals 123, 125, 127. For example, the processing network 801 may perform feature selection and distance metric selection to generate the vectors 803, 805, 807.

The vector 803 may include a first component indicating an energy level for the first audio signal 123, a second component indicating an energy level for the second audio signal 125, and a third component indicating an energy level for the third audio signal 127. The vector 805 may include a first component indicating reverberation characteristics for the first audio signal 123, a second component indicating reverberation characteristics for the second audio signal 125, and a third component indicating reverberation characteristics for the third audio signal 127. The vector 807 may include a first component indicating a noise ratio for the first audio signal 123, a second component indicating a noise ratio for the second audio signal 125, and a third component indicating a noise ratio for the third audio signal 127. The vector 803 may be provided to the node 802, the vector 805 may be provided to the node 804, and the vector 807 may be provided to the node 806.

The nodes 802, 804, 806 may be included in an "input layer" of the neural network 800, the nodes 808, 810 may be included in a "hidden layer" of the neural network 800, and the node 812 may be included in an "output layer" of the neural network 800. Prior to processing the audio signals 123, 125, 127 in real-time, the nodes 802-812 of the neural network 800 may be "trained" to determine a particular neural network feature. As used herein, "training" a node may include assigning a weight to the node to scale a corresponding input with respect to other inputs at a similar layer. To illustrate (at the input layer), the node 802 may apply a weight ($W_1$) to the vector 803, the node 804 may apply a weight ($W_2$) to the vector 805, and the node 806 may apply a weight ($W_3$) to the vector 807. Each weight ($W_1$, $W_2$, $W_3$) may indicate the "importance" of the corresponding audio property in determining the neural network feature. With respect to the hidden layer, the node 808 may apply a weight ($W_4$) to a product of the vectors 830, 832 output by the node 802 and the node 804, respectively, and the node 810 may apply a weight ($W_5$) of product of the vectors 832, 834 output by the node 804 and the node 806, respectively. With respect to the output layer, the node 812 may apply a weight ($W_6$) to a product of the vectors 844, 846 output by the node 808 and the node 810, respectively.

Each weight ($W_1$-$W_6$) may be adjusted during training of the neural network 800 by comparing an output 850 to a known value. The weights ($W_1$-$W_6$) may be iteratively adjusted during training until a threshold number of values at the output 850 accurately reflect corresponding known values.

After the nodes 802-812 have been trained, the neural network 800 may use the weights ($W_1$-$W_6$) to determine the neural network feature. The node 802 may apply the "trained" weight ($W_1$) to the vector 803 to generate a first weighted vector. The node 802 may be configured to generate the vector 830 by applying an activation function ($F_1$) (e.g., a transfer function) to the first weighted vector. The vector 830 may be provided to the node 808. In a similar manner, the node 804 may apply the trained weight ($W_2$) to the vector 805 to generate a second weighted vector. The node 804 may be configured to generate the vector 832 by applying an activation function ($F_2$) to the second weighted vector. The vector 832 may be provided to the nodes 808, 810. Similarly, the node 806 may apply the trained weight ($W_3$) to the vector 807 to generate a third weighted vector. The node 806 may be configured to generate the vector 834 by applying an activation function ($F_3$) to the third weighted vector. The vector 834 may be provided to the node 810.

The node 808 may apply the trained weight ($W_4$) to a combination (e.g., a product) of the vector 830 and the vector 832 to generate a fourth weighted vector. The node 808 may be configured to generate the vector 844 by applying an activation function ($F_4$) to the fourth weighted vector. The vector 844 may be provided to the node 812. The node 810 may apply the trained weight ($W_5$) to a combination (e.g., a product) of the vector 832 and the vector 834 to generate a fifth weighted vector. The node 810 may be configured to generate the vector 846 by applying an activation function ($F_5$) to the fifth weighted vector. The vector 846 may be provided to the node 812. The node 812 may apply the "trained" weight ($W_6$) to a combination (e.g., a product) of the vector 844 and the vector 846 to generate a sixth weighted vector. The node 812 may be configured to generate the output 850 by applying an activation function ($F_6$) to the sixth weighted vector. The output 850 may be indicative of a neural network feature. As described with respect to FIG. 9, the neural network feature may be used by the processor 104 to determine one or more characteristics, such as a size, of an acoustical environment.

Figure 9:
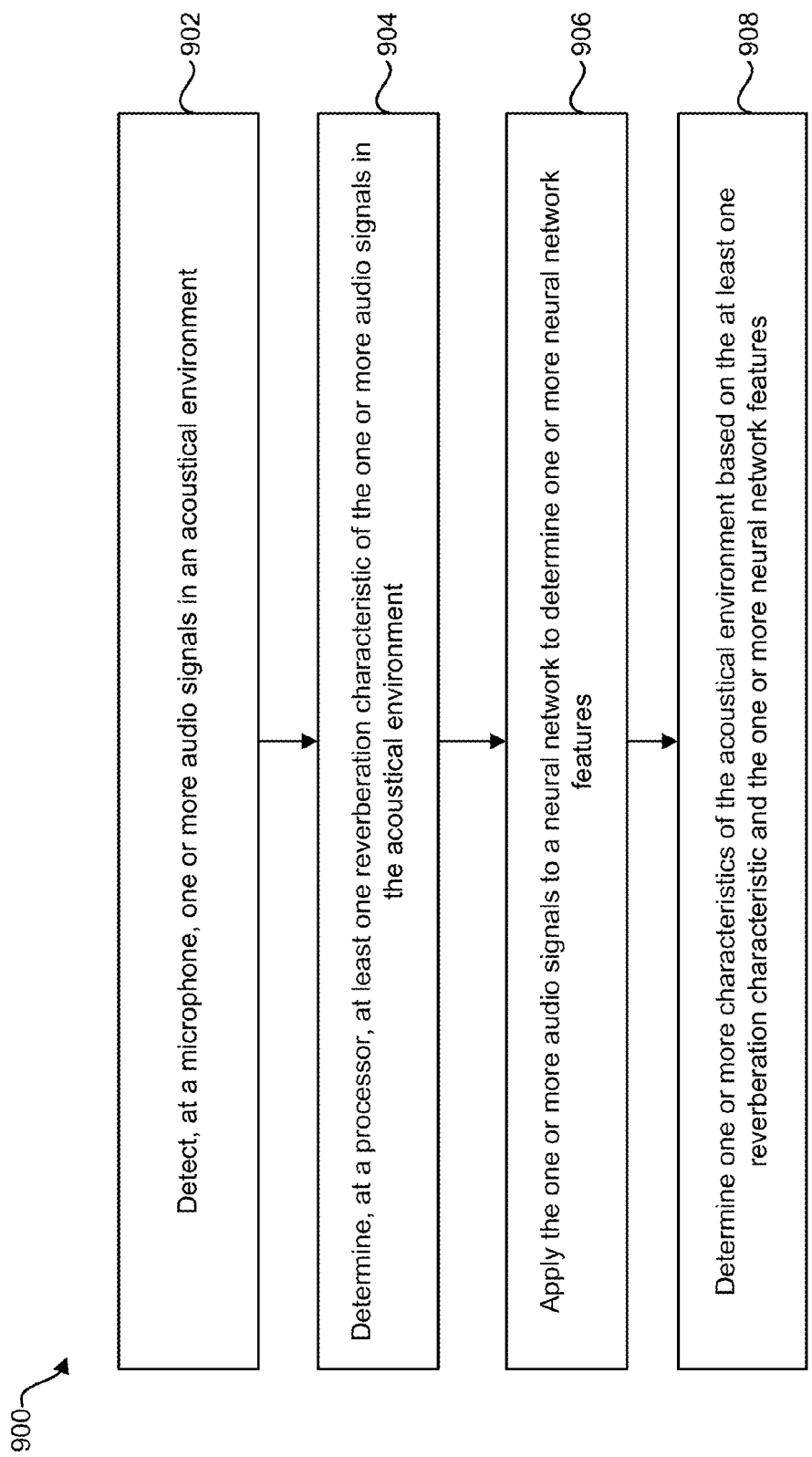
FIG. 9 is another flowchart illustrating a method for detecting a sound in an acoustical environment.

Referring to FIG. 9, a flowchart illustrating a method 900 for detecting a sound in an acoustical environment is depicted. The method 900 may be performed using the audio capture device 102 of FIGS. 1, 2, and 4.

The method 900 includes detecting, at a microphone, one or more audio signal in an acoustical environment, at 902. For example, referring to FIG. 1, a microphone of the microphone array 108 may detect the first audio signal 123, the second audio signal 125, and the third audio signal 127.

The method 900 also includes determining, at a processor, at least one reverberation characteristic of the one or more audio signals in the acoustical environment, at 904. For example, referring to FIG. 1, the processor 104 may determine a direct-to-reverberation ratio of each audio signal 123, 125, 127, a volume reduction time of each audio signal 123, 125, 127, or a combination thereof.

The method 900 also includes applying the one or more audio signals to a neural network to determine one or more neural network features, at 906. For example, referring to FIG. 8, the processor 104 may apply the audio signals 123, 125, 127 (e.g., data corresponding to the audio signals, such as signal samples, one or more signal parameters, or a combination thereof) to the neural network 800 to determine an output 850 (e.g., one or more neural network features).

The method 900 also includes determining one or more characteristics of the acoustical environment based on the at least one reverberation characteristic and the one or more neural network features, at 908. According to one implementation, the one or more characteristics may include a size of the acoustical environment. According to one implementation, the method 900 may include determining one or more characteristics of the one or more audio signals based on the at least one reverberation characteristic and the one or more neural network features. For example, the one or more characteristics of the one or more audio signals may include a distance between the microphone and a sound source of the one or more audio signals.

Figure 10:
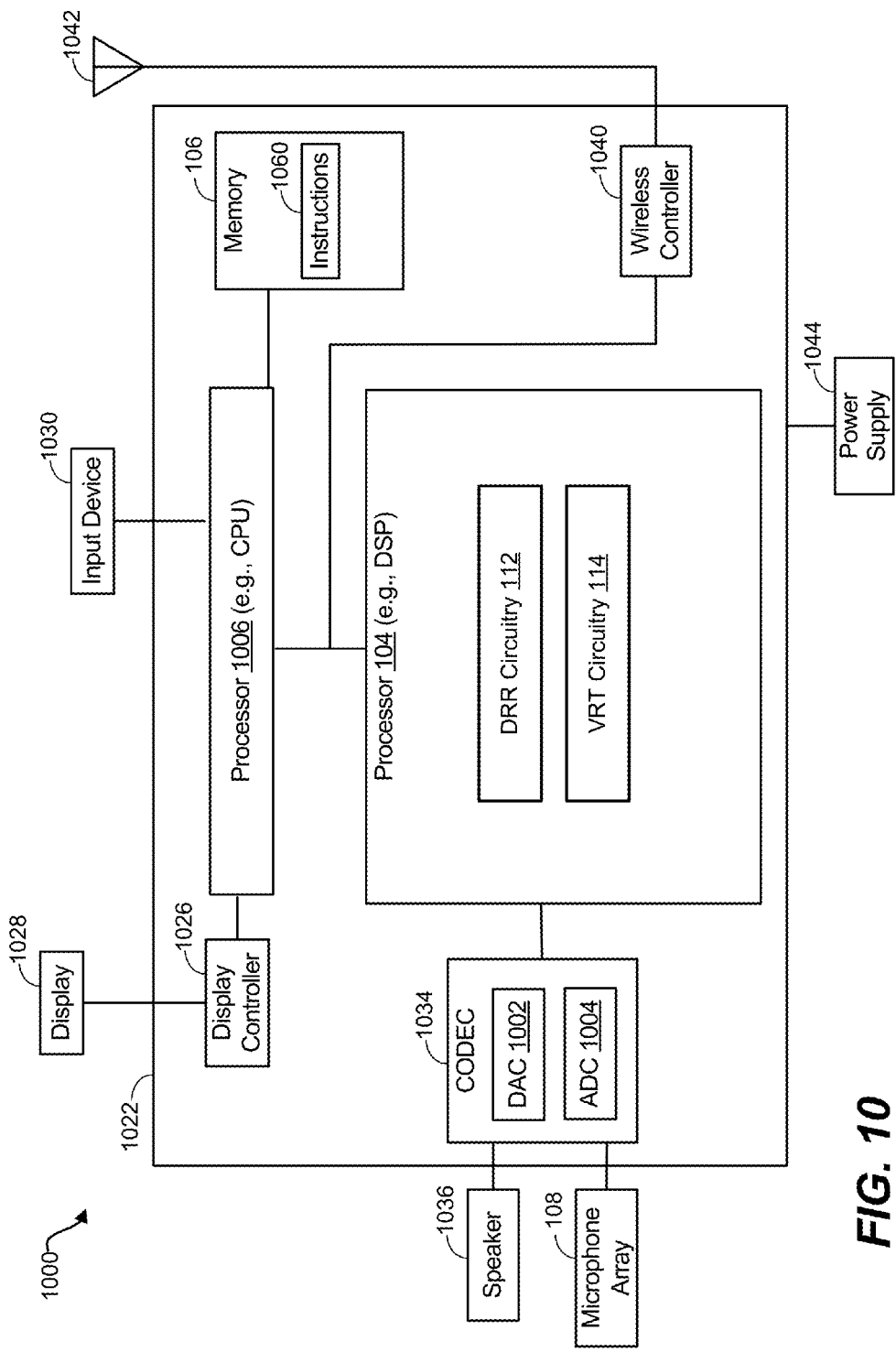
FIG. 10 illustrates a device including components operable to perform the techniques described with respect to FIGS. 1-9.

Referring to FIG. 10, a block diagram of a particular illustrative implementation of a device is depicted and generally designated 1000. In a particular implementation, the device 1000 includes a processor 1006 (e.g., a CPU). The device 1000 may include the processor 104. The processor 104 may include the DRR circuitry 112 and the VRT circuitry 114.

The device 1000 may include the memory 106 and a wireless controller 1040 coupled to an antenna 1042. The device 1000 may include a display 1028 coupled to a display controller 1026. A speaker 1036, the microphone array 108, or both may be coupled to the CODEC 1034. The CODEC 1034 may include a digital-to-analog converter (DAC) 1002 and an analog-to-digital converter (ADC) 1004. In a particular implementation, the CODEC 1034 may receive analog signals from the microphone array 108 and convert the analog signals to digital signals using the analog-to-digital converter 1004. The CODEC 1023 may receive digital signals from the processor 104 and the CODEC 1034 may convert the digital signals to analog signals using the digital-to-analog converter 1002 and may provide the analog signals to the speaker 1036.

The memory 106 may include instructions 1060 executable by the processor 1006, the processor 104, the CODEC 1034, another processing unit of the device 1000, or a combination thereof, to perform methods and processes disclosed herein, such as one or more of the methods 500-700, 900 of FIGS. 5-7 and 9. One or more components of the apparatus/systems disclosed herein may be implemented via dedicated hardware (e.g., circuitry), by a processor executing instructions (e.g., the instructions 1060) to perform one or more tasks, or a combination thereof. As an example, the memory 106 or one or more components of the processor 1006, the processor 104, and/or the CODEC 1034 may be a memory device, such as a random access memory (RAM), magnetoresistive random access memory (MRAM), spin-torque transfer MRAM (STT-MRAM), flash memory, read-only memory (ROM), programmable read-only memory (PROM), erasable programmable read-only memory (EPROM), electrically erasable programmable read-only memory (EEPROM), registers, hard disk, a removable disk, or a compact disc read-only memory (CD-ROM). The memory device may include instructions (e.g., the instructions 1060) that, when executed by a computer (e.g., a processor in the CODEC 1034, the processor 1006, and/or the processor 104), may cause the computer to perform at least a portion of one or more of the methods described herein. As an example, the memory 106 or the one or more components of the processor 1006, the processor 104, and/or the CODEC 1034 may be a non-transitory computer-readable medium that includes instructions (e.g., the instructions 1060) that, when executed by a computer (e.g., a processor in the CODEC 1034, the processor 1006, and/or the processors 1010), cause the computer perform at least a portion of one or more of the methods disclosed herein.

In a particular implementation, the device 1000 may be included in a system-in-package or system-on-chip device 1022, such as a mobile station modem (MSM). In a particular implementation, the processor 1006, the processor 104, the display controller 1026, the memory 106, the CODEC 1034, and the wireless controller 1040 are included in a system-in-package or the system-on-chip device 1022. In a particular implementation, an input device 1030, such as a touchscreen and/or keypad, and a power supply 1044 are coupled to the system-on-chip device 1022. Moreover, in a particular implementation, as illustrated in FIG. 10, the display 1028, the input device 1030, the speaker 1036, the microphone array 108, the antenna 1042, and the power supply 1044 are external to the system-on-chip device 1022. However, each of the display 1028, the input device 1030, the speaker 1048, the microphone 1046, the antenna 1042, and the power supply 1044 can be coupled to a component of the system-on-chip device 1022, such as an interface or a controller. In an illustrative example, the device 1000 corresponds to a mobile communication device, a smart-phone, a cellular phone, a laptop computer, a computer, a tablet computer, a personal digital assistant, a display device, a television, a gaming console, a music player, a radio, a digital video player, an optical disc player, a tuner, a camera, a navigation device, a decoder system, an encoder system, a device within a manned or unmanned vehicle, such as an automobile or an aerial vehicle, or any combination thereof.

In conjunction with the described implementations, a first apparatus for detecting a sound in an acoustical environment includes means for detecting an audio signal in the acoustical environment. For example, the means for detecting the audio signal may include the microphone array 108 of FIGS. 1 and 10, one or more devices, a processor executing instructions at a non-transitory computer readable storage medium, or any combination thereof.

The first apparatus may also include means for determining an angular location of a sound source of the audio signal. The angular location may be relative to the means for detecting. For example, the means for determining the angular location may include the processor 104 of FIGS. 1-10, one or more devices, a processor executing instructions at a non-transitory computer readable storage medium, or any combination thereof.

The first apparatus may also include means for determining at least one reverberation characteristic of the audio signal in the acoustical environment. For example, the means for determining the at least one reverberation characteristic may include the processor 104 of FIGS. 1-10, one or more devices, a processor executing instructions at a non-transitory computer readable storage medium, or any combination thereof.

The first apparatus may also include means for determining a distance of the sound source along an axis associated with the angular location based on the at least one reverberation characteristic. The distance may be relative to the means for detecting. For example, the means for determining the distance may include the processor 104 of FIGS. 1-10, one or more devices, a processor executing instructions at a non-transitory computer readable storage medium, or any combination thereof.

In conjunction with the described implementations, a second apparatus for detecting a sound in an acoustical environment includes means for detecting an audio signal in the acoustical environment. For example, the means for detecting may include the microphone array 108 of FIGS. 1 and 10, one or more devices, a processor executing instructions at a non-transitory computer readable storage medium, or any combination thereof.

The second apparatus may also include means for determining a direct energy component of the audio signal. For example, the means for determining the direct energy component may include the processor 104 of FIGS. 1-10, one or more devices, a processor executing instructions at a non-transitory computer readable storage medium, or any combination thereof.

The second apparatus may also include means for determining a reverberation energy component of the audio signal. For example, the means for determining the reverberation energy component may include the processor 104 of FIGS. 1-10, one or more devices, a processor executing instructions at a non-transitory computer readable storage medium, or any combination thereof.

The second apparatus may also include means for determining a distance of a sound source of the audio signal from the means for detecting based on the direct energy component and the reverberation energy component. For example, the means for comparing may include the processor 104 of FIGS. 1-10, one or more devices, a processor executing instructions at a non-transitory computer readable storage medium, or any combination thereof.

The second apparatus may also include means for classifying the audio signal as foreground audio or background audio based on the distance. For example, the means for classifying may include the processor 104 of FIGS. 1-10, one or more devices, a processor executing instructions at a non-transitory computer readable storage medium, or any combination thereof.

In conjunction with the described implementations, a third apparatus for detecting a sound in an acoustical environment includes means for detecting one or more audio signals in the acoustical environment. For example, the means for detecting may include the microphone array 108 of FIGS. 1 and 10, one or more devices, a processor executing instructions at a non-transitory computer readable storage medium, or any combination thereof.

The third apparatus may also include means for determining at least one reverberation characteristic of the one or more audio signals in the acoustical environment. For example, the means for determining the at least one reverberation characteristic may include the processor 104 of FIGS. 1-10, one or more devices, a processor executing instructions at a non-transitory computer readable storage medium, or any combination thereof.

The third apparatus may also include means for applying the one or more audio signals to a neural network to determine one or more neural network features. For example, the means for applying the one or more audio signals to the neural network may include the processor 104 of FIGS. 1-10, one or more devices, a processor executing instructions at a non-transitory computer readable storage medium, or any combination thereof.

The third apparatus may also include means for determining one or more characteristics of the acoustical environment based on the at least one reverberation characteristic and the one or more neural network features. For example, the means for determining the one or more characteristics of the acoustical environment may include the processor 104 of FIGS. 1-10, one or more devices, a processor executing instructions at a non-transitory computer readable storage medium, or any combination thereof.

In conjunction with the described implementations, a fourth apparatus for detecting a sound in an acoustical environment includes means for detecting a first audio signal in the acoustical environment and a second audio signal in the acoustical environment. The first audio signal may be generated from a first sound source, and the second audio signal may be generated from a second sound source. For example, the means for detecting may include the microphone array 108 of FIGS. 1 and 10, one or more devices, a processor executing instructions at a non-transitory computer readable storage medium, or any combination thereof.

The fourth apparatus may also include means for determining a first reverberation characteristic of the first audio signal in the acoustical environment and a second reverberation characteristic of the second audio signal in the acoustical environment. For example, the means for determining may include the processor 104 of FIGS. 1-10, one or more devices, a processor executing instructions at a non-transitory computer readable storage medium, or any combination thereof.

The fourth apparatus may also include means for determining a first distance between the first sound source and the means for detecting based on the first reverberation characteristic. The first sound source may be located along an axis associated with a first angular location relative to the means for detecting. For example, the means for determining the first distance may include the processor 104 of FIGS. 1-10, one or more devices, a processor executing instructions at a non-transitory computer readable storage medium, or any combination thereof.

The fourth apparatus may also include means for determining a second distance between the second sound source and the means for detecting based on the second reverberation characteristic. The second sound source may be located along an axis associated with a second angular location relative to the means for detecting. For example, the means for determining the second distance may include the processor 104 of FIGS. 1-10, one or more devices, a processor executing instructions at a non-transitory computer readable storage medium, or any combination thereof.

Those of skill would further appreciate that the various illustrative logical blocks, configurations, modules, circuits, and algorithm steps described in connection with the aspects disclosed herein may be implemented as electronic hardware, computer software executed by a processing device such as a hardware processor, or combinations of both. Various illustrative components, blocks, configurations, modules, circuits, and steps have been described above generally in terms of their functionality. Whether such functionality is implemented as hardware or executable software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the aspects disclosed herein may be embodied directly in hardware, in a software module executed by a processor, or in a combination of the two. A software module may reside in a memory device, such as random access memory (RAM), magnetoresistive random access memory (MRAM), spin-torque transfer MRAM (STT-MRAM), flash memory, read-only memory (ROM), programmable read-only memory (PROM), erasable programmable read-only memory (EPROM), electrically erasable programmable read-only memory (EEPROM), registers, hard disk, a removable disk, or a compact disc read-only memory (CD-ROM). An exemplary memory device is coupled to the processor such that the processor can read information from, and write information to, the memory device. In the alternative, the memory device may be integral to the processor. The processor and the storage medium may reside in an ASIC. The ASIC may reside in a computing device or a user terminal. In the alternative, the processor and the storage medium may reside as discrete components in a computing device or a user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. An apparatus for detecting a sound in an acoustical environment, the apparatus comprising:
   a microphone array configured to detect an audio signal in the acoustical environment; and
   a processor configured to:
   determine a direct energy component of the audio signal;
   determine a reverberation characteristic of the audio signal, wherein the reverberation characteristic comprises a reverberation energy component of the audio signal;
   determine a distance of a sound source of the audio signal from the microphone array based on the direct energy component and the reverberation energy component;
   classify the audio signal as foreground audio or background audio based on the distance;
   allocate a first number of bits to the audio signal for an encoding operation in response to the audio signal being classified as foreground audio; and
   allocate a second number of bits to the audio signal for the encoding operation in response to the audio signal being classified as background audio, the second number of bits less than the first number of bits.

2. The apparatus of claim 1, wherein the reverberation characteristic includes a direct-to-reverberation ratio of the audio signal.

3. The apparatus of claim 1, wherein the processor is further configured to encode a data packet during the encoding operation to generate an encoded data packet.

4. The apparatus of claim 3, wherein the first number of bits are used in the encoded data packet to encode the audio signal in response to the audio signal being classified as foreground audio.

5. The apparatus of claim 3, wherein the second number of bits are used in the encoded data packet to encode the audio signal in response to the audio signal being classified as background audio.

6. The apparatus of claim 3, further comprising a transmitter configured to transmit the encoded data packet to a remote device.

7. The apparatus of claim 1, wherein the reverberation characteristic includes a volume reduction time of the audio signal, the volume reduction time corresponding to an amount of time for a volume of the audio signal to decrease by a particular percentage.

8. The apparatus of claim 7, wherein the particular percentage is sixty percent.

9. The apparatus of claim 1, wherein the processor is further configured to:
   determine whether the sound source is located in a first zone of the acoustical environment or a second zone of the acoustical environment, wherein the first zone is closer to microphone array than the second zone.

10. The apparatus of claim 1, further comprising a user interface configured to display a location of the sound source relative to the microphone array.

11. The apparatus of claim 9, wherein the user interface is further configured to display a visual representation of the first zone and the second zone.

12. The apparatus of claim 9, wherein the first zone and the second zone comprise concentric circles having center points located at the microphone array.

13. The apparatus of claim 9, wherein each zone of the acoustical environment comprises a rectangular section having a center point located at the microphone array or a fixed microphone array.

14. The apparatus of claim 1, wherein the microphone array comprises a movable microphone array.

15. The apparatus of claim 1, wherein the processor is further configured to determine a location of the microphone array in the acoustical environment based on the reverberation characteristic, wherein the microphone array is included in a robot, a headset, or a mobile device.

16. The apparatus of claim 1, further comprising a speaker recognition unit configured to identify the audio signals from the sound source using a speech acoustic model.

17. The apparatus of claim 1, wherein the processor is further configured to:
   determine one or more additional reverberation characteristics of one or more additional audio signals; and
   track a change in location of the sound source based on a comparison between the reverberation characteristic and the one or more additional reverberation characteristics.

* * * * *